(12) United States Patent
Ruhland et al.

(10) Patent No.: US 7,442,221 B2
(45) Date of Patent: Oct. 28, 2008

(54) FILTER ELEMENT

(75) Inventors: Klaus-Dieter Ruhland, Meckenheim (DE); Edvard Kopec, Speyer (DE)

(73) Assignee: Mann & Hummel GmbH, Ludwigsburg (DE)

( * ) Notice: Subject to any disclaimer, the term of this patent is extended or adjusted under 35 U.S.C. 154(b) by 175 days.

(21) Appl. No.: 11/471,651

(22) Filed: Jun. 21, 2006

(65) Prior Publication Data

US 2007/0006560 A1 Jan. 11, 2007

(51) Int. Cl.
*B01D 46/00* (2006.01)

(52) U.S. Cl. .............................. 55/497; 55/502; 55/521; 55/DIG. 31

(58) Field of Classification Search .................. 55/497, 55/500, 501, 502, 511, 521, DIG. 31
See application file for complete search history.

(56) References Cited

U.S. PATENT DOCUMENTS

| 4,976,857 | A | * | 12/1990 | Solomon | 210/493.5 |
| 5,022,901 | A | * | 6/1991 | Meunier | 96/134 |
| 5,063,926 | A | * | 11/1991 | Forsgren et al. | 128/206.17 |
| 5,240,479 | A | * | 8/1993 | Bachinski | 96/17 |
| 6,203,592 | B1 | * | 3/2001 | Carawan | 55/484 |
| 6,485,544 | B1 | | 11/2002 | Ziske | |
| 6,752,846 | B2 | * | 6/2004 | Rotter et al. | 55/385.3 |
| 6,758,878 | B2 | * | 7/2004 | Choi et al. | 55/497 |
| 6,966,940 | B2 | * | 11/2005 | Krisko et al. | 55/497 |
| 7,008,467 | B2 | * | 3/2006 | Krisko et al. | 95/268 |
| 7,282,076 | B2 | * | 10/2007 | Mahan | 55/482 |
| 7,300,486 | B1 | * | 11/2007 | Kirsch | 55/502 |
| 7,341,613 | B2 | * | 3/2008 | Kirsch | 55/495 |
| 2004/0011010 | A1 | | 1/2004 | Rotter et al. | |
| 2005/0022484 | A1 | | 2/2005 | Krisko et al. | |

FOREIGN PATENT DOCUMENTS

| DE | 12 99 534 | 7/1969 |
| DE | 39 25 511 C1 | 8/1990 |

OTHER PUBLICATIONS

European Search Report dated Sep. 20, 2006 (eight (8) pages).

* cited by examiner

*Primary Examiner*—Duane Smith
*Assistant Examiner*—Robert A Clemente
(74) *Attorney, Agent, or Firm*—Crowell & Moring LLP

(57) ABSTRACT

A filter element, particularly a secondary element for a filter system in the intake tract of an internal combustion engine, which filter element includes a zig-zag pleated filter medium surrounded by a circumferential frame of polyurethane foam. The frame has a substantially oval contour and is insertable into an oval opening. To reproduce the oval contour, the plate-like medium has beveled lateral regions, such that a maximum effective filter surface is obtained with a minimum amount of waste. A circumferential groove or a circumferential web is provided in the frame to seal the polyurethane foam frame to the opening.

8 Claims, 2 Drawing Sheets

FILTER ELEMENT

BACKGROUND OF THE INVENTION

The present invention relates to a filter element, particularly a secondary element for a filter system in the intake tract of an internal combustion engine, comprising a zig-zag pleated filter medium, which is surrounded by a circumferential frame of polyurethane foam.

German patent no. DE 12 99 534 discloses a filter insert made of a folded filter material. This filter insert is provided with an adhesive mass, which is bonded to the filter material and extends transversely of the fold edges. This adhesive is used as a spacer.

Conventional filters of this type for motor vehicle engines also use an adhesive mass or adhesive beads as spacers. Such adhesive beads are at the same time applied continuously along the sides of the filter material during manufacture. In zig-zag pleated filter materials, these adhesive beads serve as a lateral seal of the filter insert.

With continued advances in automotive engineering and the development toward compact vehicles, less and less space is available for a filter system in the engine compartment of a motor vehicle. The space is often insufficient for a conventional rectangular cartridge, so that two filters or two filter systems are sometimes placed in different locations.

SUMMARY OF THE INVENTION

It is an object of the present invention to provide an improved oval filter element.

Another object of the invention is to provide a filter element particularly suited for use as a secondary element for a filter system in the air intake tract of an internal combustion engine.

A further object of the invention is to provide a filter element that can be optimally adapted to given space conditions.

These and other objects are achieved in accordance with the present invention by providing a filter element comprising a flat body of pleated filter medium surrounded by a circumferential frame of polyurethane foam, wherein the frame has a substantially oval contour and is insertable into an oval opening; the body of pleated filter medium has lateral regions beveled to match the oval contour, such that a maximum effective filter surface is obtainable with a minimum amount of waste, and a circumferential groove or a circumferential web is provided in the frame to seal the foam frame to the oval opening when the frame is inserted in the opening.

A substantial advantage of the invention is that the filter element has an oval contour. This makes it possible to use installation spaces that are relatively low in height. To obtain such an oval contour of the filter medium, the filter medium is beveled, i.e., a filter medium is created whose shape is optimally adapted to the oval contour. The junction between the filter medium and the corresponding opening, which is to be covered by the filter element, is provided by a polyurethane foam frame having a sealing edge.

In accordance with one embodiment of the invention, the folds of the filter medium are bonded together along the outer faces to create an effective lateral seal. These outer faces are partly or completely embedded in the polyurethane foam. To reinforce the filter element, the folds may advantageously be provided with reinforcement strips along their peaks. These reinforcement strips comprise, for example, beads of hot melt adhesive or some other stabilizing material.

In a further refinement, a groove or a web disposed in the polyurethane foam frame has conical lateral surfaces to ensure a reliable seal in relation to the opening of the mating part if tolerances are relatively large.

In another embodiment, a support frame made of a thermoplastic material is provided in addition to the polyurethane foam frame. This support frame is embedded in the polyurethane foam and has stabilizing properties. The advantage of this combination is that the polyurethane foam ensures a reliable seal on the one hand and the support frame provides stability on the other.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative embodiments shown in the accompanying drawings, in which.

DETAILED DESCRIPTION OF PREFERRED EMBODIMENTS

Figure 1:
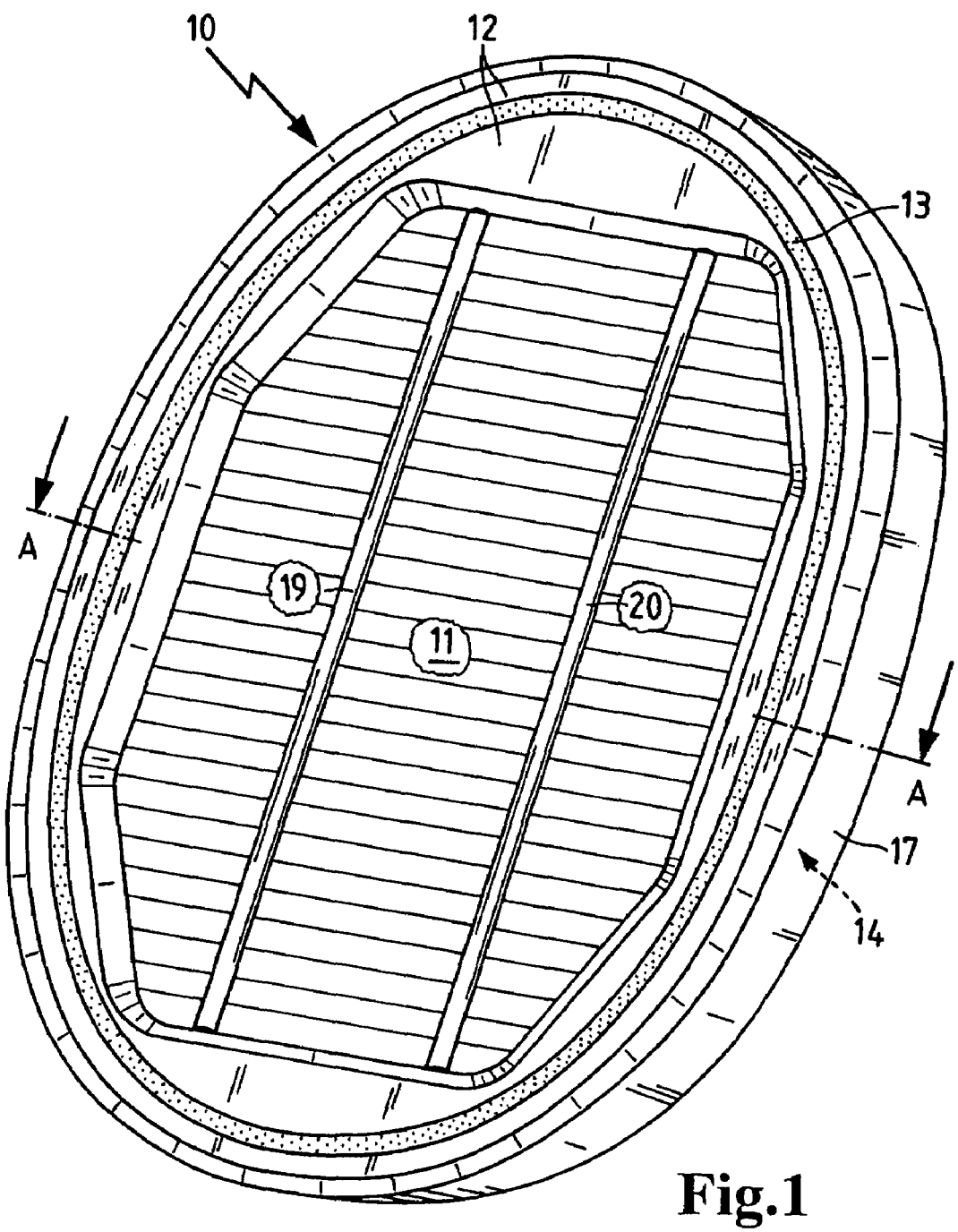
FIG. 1 is a perspective view of a filter element according to the invention.

FIG. 1 shows a filter element 10 in the form of a secondary element for a filter system in the intake tract of an internal combustion engine. It comprises a zig-zag pleated, plate-like or flat filter medium 11 having a substantially rectangular shape. In the region of the curvatures, the filter medium is cut diagonally along the end faces to adapt it to the curve of the oval filter element 10.

The seal of the entire element is provided by a polyurethane foam frame 12, which has a circumferential groove 13. The passage for the air to be filtered has a maximum effective filter surface with a minimum of waste of filter medium. The polyurethane foam frame 12 is supported by a support frame 14, which is made of a thermoplastic material, e.g. polyamide or polypropylene.

Figure 2:
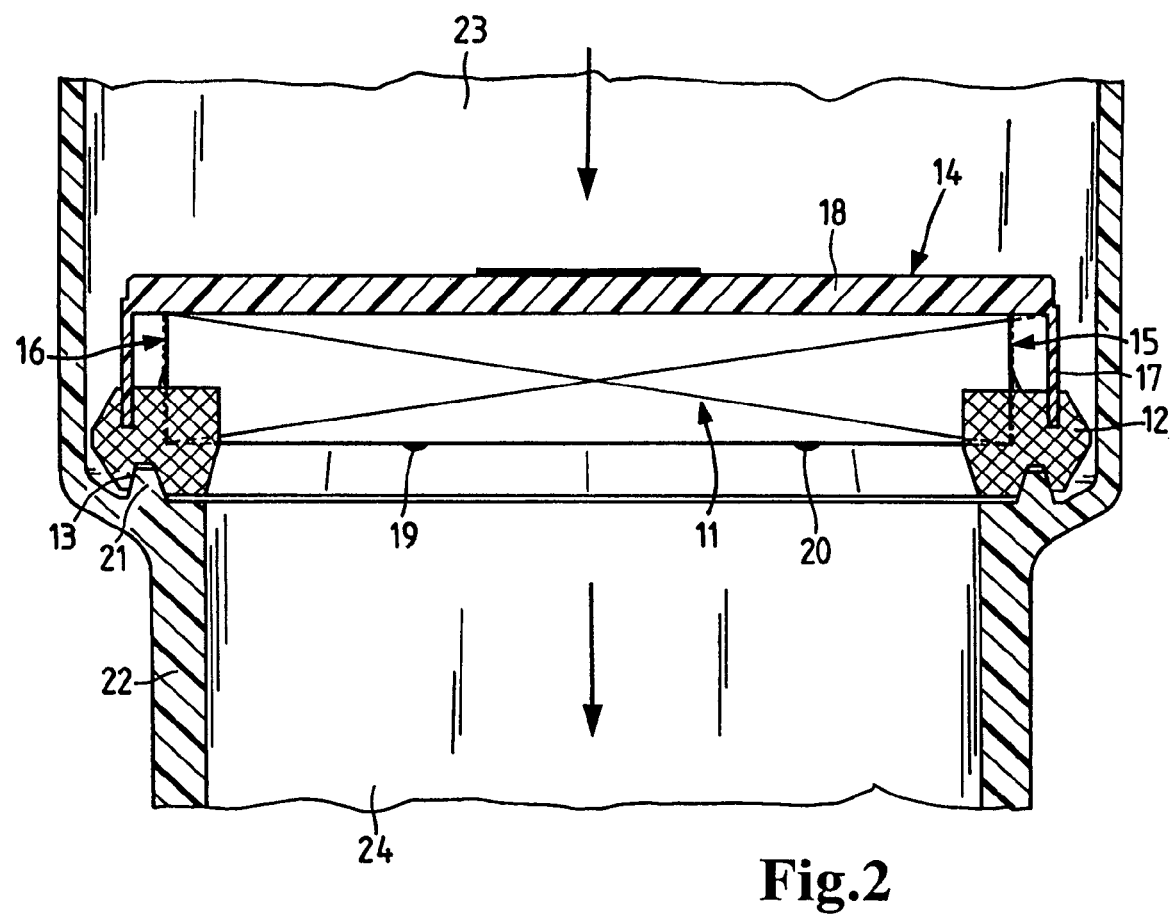
FIG. 2 is a sectional view of the filter element shown in FIG. 1.

FIG. 2 is a sectional view of the parts depicted in FIG. 1 in which like parts are identified by the same reference numerals. The filter medium 11 is sealed along the face edges 15, 16 by an adhesive layer. This adhesive layer extends up into the region of the polyurethane foam frame 12. The polyurethane foam frame simultaneously acts a seat for a circumferential web 17 of the support frame 14.

On the inflow side of the filter element 11, the support frame has at least one rib 18 adapted to remove the filter element from the depicted position. The rib may furthermore be connected to the filter medium 11 and enhance the stability of the filter medium. On the side of the filter medium opposite the rib 18 are two continuous beads of adhesive 19, 20, which reinforce the filter medium, as shown also in FIG. 1.

The polyurethane foam frame 12 has a circumferential groove 13, which is likewise shown in FIG. 1. A web 21 of a housing 22 engages in this groove 13 to create a seal between the inflow side 23 and the outflow side 24 of the filter system. On the inflow side is disposed a main filter element (not shown), which filters the intake air. The primary role of the secondary element is to effectively prevent particles from entering the intake tract of an internal combustion engine during maintenance or if the main element is defective.

The conically shaped lateral surfaces of the web 21 and the groove 13 ensure a reliable seal on the one hand and simplify the handling of the filter element on the other. No great force is required to pull the filter element out in order to replace it. When necessary, the filter element can be simply lifted from its position and be replaced by a new filter element.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element comprising a flat body of pleated filter medium surrounded by a circumferential frame of polyurethane foam, wherein the frame has a substantially oval contour and is insertable into an oval opening; the body of pleated filter medium has lateral regions beveled to match the oval contour, such that a maximum effective filter surface is obtainable with a minimum amount of waste, and a circumferential groove or a circumferential web is provided in the frame to seal the foam frame to the oval opening when the frame is inserted in the opening.

2. A filter element according to claim 1, wherein the folds of the pleated filter medium are bonded to each other along the outer faces and are at least partly embedded in the polyurethane foam.

3. A filter element according to claim 2, wherein the outer faces of the folds are completely embedded in the polyurethane foam.

4. A filter element according to claim 1, wherein reinforcement strips are disposed perpendicularly to the fold direction over the entire filter medium.

5. A filter element according to claim 1, wherein said reinforcement strips comprise beads of adhesive.

6. A filter element according to claim 1, wherein the groove or the web has conical lateral surfaces to ensure a reliable seal along the opening in cooperation with the mating part.

7. A filter element according to claim 1, wherein the folds of the filter medium are bonded together along the outer faces and are embedded in the polyurethane foam, and wherein a support frame made of a thermoplastic material is provided, which is embedded into the polyurethane foam.

8. A filter element according to claim 1, wherein said filter element is a secondary filter element arranged downstream of a primary filter in an air intake tract of an internal combustion engine.

* * * * *